US008327344B2

(12) United States Patent
Gschwind

(10) Patent No.: US 8,327,344 B2
(45) Date of Patent: Dec. 4, 2012

(54) ARRAY REFERENCE SAFETY ANALYSIS IN THE PRESENCE OF LOOPS WITH CONDITIONAL CONTROL FLOW

(75) Inventor: Michael K. Gschwind, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1074 days.

(21) Appl. No.: 12/250,562

(22) Filed: Oct. 14, 2008

(65) Prior Publication Data

US 2010/0095285 A1 Apr. 15, 2010

(51) Int. Cl.
G06F 9/45 (2006.01)

(52) U.S. Cl. ......... 717/160; 717/149; 717/150; 717/161

(58) Field of Classification Search ........................ None
See application file for complete search history.

(56) References Cited

U.S. PATENT DOCUMENTS

| 3,389,379 | A | 6/1968 | Erickson et al. | |
|---|---|---|---|---|
| 5,646,875 | A | 7/1997 | Taborn et al. | |
| 5,933,650 | A | 8/1999 | van Hook et al. | |
| 6,041,404 | A | 3/2000 | Roussel et al. | |
| 6,317,824 | B1 | 11/2001 | Thakkar et al. | |
| 6,343,375 | B1 * | 1/2002 | Gupta et al. | 717/152 |
| 6,446,198 | B1 | 9/2002 | Sazegari | |
| 6,839,828 | B2 | 1/2005 | Gschwind et al. | |
| 6,924,802 | B2 | 8/2005 | Fossum et al. | |
| 7,134,120 | B2 * | 11/2006 | Hammes | 717/150 |
| 7,464,255 | B1 | 12/2008 | Tan et al. | |
| 7,581,215 | B1 * | 8/2009 | Song et al. | 717/160 |
| 7,765,534 | B2 * | 7/2010 | Archambault et al. | 717/150 |
| 7,865,693 | B2 | 1/2011 | Eichenberger et al. | |
| 7,900,025 | B2 | 3/2011 | Gschwind | |
| 7,962,718 | B2 | 6/2011 | Moyer | |
| 8,010,953 | B2 * | 8/2011 | Gschwind | 717/149 |
| 2004/0093591 | A1 * | 5/2004 | Kalogeropulos et al. | 717/161 |
| 2004/0098711 | A1 * | 5/2004 | Song et al. | 717/150 |
| 2005/0138613 | A1 * | 6/2005 | Archambault et al. | 717/160 |
| 2005/0246700 | A1 * | 11/2005 | Archambault et al. | 717/160 |
| 2006/0031652 | A1 * | 2/2006 | Richter et al. | 711/165 |
| 2007/0011441 | A1 | 1/2007 | Eichenberger et al. | |

(Continued)

OTHER PUBLICATIONS

Budiu et al., "Inter-Iteration Scalar Replacement in the Presence of Conditional Control-Flow", Mar. 2005, Microsoft Research, pp. 1-10; <http://research.microsoft.com/pubs/64253/odes05.pdf>.*

(Continued)

Primary Examiner — Thuy Dao
Assistant Examiner — Ben C Wang
(74) Attorney, Agent, or Firm — Stephen J. Walder, Jr.; William Stock

(57) ABSTRACT

Mechanisms are provided for analyzing and optimizing loops with conditional control flow in source code based on array reference safety. Mechanisms are provided for analyzing blocks of the source code to identify a conditional control flow loop having loop source code specifying a total access range for an array reference. A safe access range, of the total access range of the array reference in the loop source code, is identified over which a compiler-based optimization of the loop source code can be safely applied without introducing new exception conditions. The compiler-based optimization of the loop source code is performed based on the identified safe access range to generate optimized code. The optimized code is output for generation of executable code for execution on a processor.

16 Claims, 8 Drawing Sheets

U.S. PATENT DOCUMENTS

| | | | |
|---|---|---|---|
| 2008/0034357 A1* | 2/2008 | Gschwind | 717/149 |
| 2009/0037694 A1 | 2/2009 | Luick et al. | |
| 2009/0049113 A1 | 2/2009 | Muff et al. | |
| 2009/0172358 A1 | 7/2009 | Sperber et al. | |
| 2009/0172366 A1 | 7/2009 | Anderson et al. | |
| 2009/0198966 A1* | 8/2009 | Gschwind et al. | 712/208 |
| 2009/0198977 A1 | 8/2009 | Gschwind et al. | |
| 2009/0307656 A1* | 12/2009 | Eichenberger et al. | 717/110 |
| 2009/0307674 A1* | 12/2009 | Ng et al. | 717/160 |
| 2010/0070956 A1* | 3/2010 | Leung et al. | 717/161 |
| 2010/0095086 A1* | 4/2010 | Eichenberger et al. | 712/2 |
| 2010/0095087 A1* | 4/2010 | Eichenberger et al. | 712/4 |
| 2010/0095097 A1* | 4/2010 | Gschwind | 712/222 |
| 2010/0095098 A1* | 4/2010 | Gschwind | 712/222 |
| 2010/0257221 A1 | 10/2010 | Jiang | |
| 2011/0040822 A1 | 2/2011 | Eichenberger et al. | |
| 2011/0047359 A1 | 2/2011 | Eichberger et al. | |
| 2012/0011348 A1 | 1/2012 | Eichenberger et al. | |
| 2012/0167069 A1* | 6/2012 | Lin et al. | 717/160 |

OTHER PUBLICATIONS

Oancea et al., "Logical Inference Techniques for Loop Parallelization", 2012 ACM, PLDI'12 Beijing, China, pp. 509-520; <http://dl.acm.org/results.cfm?h=1&cfid=95745499&cftoken=10649473>.*

Choi et al., "Compiler Analysis for Cache Coherence: Inter-procedural Array Data-Flow Analysis and Its Impact on Cache Performance", 2000 IEEE, pp. 879-896; <http://ieeexplore.ieee.org/stamp/stamp.jsp?tp=&arnumber=879772>.*

Office Action mailed Mar. 1, 2011 for U.S. Appl. No. 12/250,584; 23 pages.

Interview Summary dated Apr. 16, 2010 for U.S. Appl. No. 12/250,599; 3 pages.

Office Action dated May 25, 2010 for U.S. Appl. No. 12/250,599; 10 pages.

Office Action dated Jun. 30, 2010 for U.S. Appl. No. 12/250,575; 10 pages.

Response to Office Action dated Apr. 13, 2010 for U.S. Appl. No. 12/250,599; 22 pages.

Response to Restriction Requirement filed with the USPTO on Jun. 16, 2010 for U.S. Appl. No. 12/250,575; 9 pages.

Restriction Requirement dated May 21, 2010 for U.S. Appl. No. 12/250,575; 5 pages.

Notice of Allowance mailed Aug. 27, 2010 for U.S. Appl. No. 12/250,599; 6 pages.

Notice of Allowance mailed Oct. 21, 2010 for U.S. Appl. No. 12/250,575; 6 pages.

Response to Office Action filed Aug. 20, 2010, U.S. Appl. No. 12/250,599, 16 pages.

Response to Office Action filed with the USPTO on Sep. 29, 2010 for U.S. Appl. No. 12/250,575, 18 pages.

Final Office Action mailed Aug. 5, 2011 for U.S. Appl. No. 12/250,584; 21 pages.

Response to Office Action filed with the USPTO on Jun. 1, 2011 for U.S. Appl. No. 12/250,584, 23 pages.

"Power ISA, Version 2.04", IBM Corporation, Apr. 3, 2007, accessible at http://www.power.org/resources/downloads/PowerISA_203.Public.pdf, 874 pages (21 pages submitted herewith).

"Synergistic Processor Unit Instruction Set Architecture, Version 1.2", IBM Corporation, Jan. 27, 2007, http://www-01.ibm.com/chips/techlib/techlib.nsf/techdocs/76CA6C7304210F3987257060006F2C44/$file/SPU_ISA_v1.2_27Jan2007 pub.pdf, 279 pages.

"The VIS Instruction Set, Version 1.0", Sun Microsystems Inc., A White Paper, Jun. 2002, 34 pages.

Bachega, Leonardo et al., "A High-Performance SIMD Floating Point Unit for BlueGene/L: Architecture, Compilation, and Algorithm Design", Proceedings of the 13th International Conference on Parallel Architecture and Compilation Techniques (PACT'04), pp. 1-12.

Eichenberger, Alexandre E. et al., "Optimizing Compiler for a Cell Processor", IEEE, PACT'05, 2005, http://domino.research.ibm.com/comm/research_projects.nsf/pp./cellcompiler. refs.html/$FILE/paper-eichen-pact05.pdf, 12 pages.

U.S. Appl. No. 12/023,720, filed Jan. 31, 2008, Gschwind et al.

U.S. Appl. No. 12/023,768, filed Jan. 1, 31, 2008, Gschwind et al.

U.S. Appl. No. 12/134,495, filed Jun. 6, 2008, Eichenberger et al.

Eichenberger, Alexandre E. et al., "Using advanced compiler technology to exploit the performance of the Cell Broadband Engine architecture", IBM Corporation, IBM Systems Journal, vol. 45, No. 1, 2006, http:www.research.ibm.com/journals/sj/451/eichenberger.pdf, pp. 59-84.

Gibbs, Ben et al., "IBM eServer BladeCenter JS20 PowerPc 970 Programming Environment", Jan. 2005, www.redbooks.ibm.com/redpapers/pdfs/redp3890.pdf, 140 pages.

Gschwind, Michael et al., "Synergistic Processing in Cell's Multicore Architecture", IEEE Micro, vol. 26, No. 2, 2006, pp. 10-24.

Thompson, Tom, "AltiVec Revealed", MACTECH, vol. 15, No. 7, 1999, http://www.mactech.com/articles/mactech/Vol.15/15.07/AltiVecRevealed/, 19 pages.

Wait, C.D., "IBM PowerPC 440 FPU with complex-arithmetic extensions", IBM Corporation, IBM J. Res. & Dev., vol. 49, No. 2/3, Mar./May 2005, http://www.research.ibm.com/journal/rd/492/wait.pdf, pp. 249-254.

Bik, Aart J.C. et al., "Automatic Intra-Register Vectorization for the Intel Architecture", International Journal of Parallel Programming, vol. 30, No. 2, Apr. 2002, pp. 65-98.

Eichenberger, Alexandre et al., "Vectorization for SIMD Architectures with Alignment Constraints", Proceedings of the Conference on Programming Language Design and Implementation (PLDI), 2004, 12 pages.

Wu, Peng et al., "An Integrated Simdization Framework Using Virtual Vectors", Proceedings of the International Conference on Supercomputing (ICS), 2005, 10 pages.

Wu, Peng et al., "Efficient SIMD Code Generation for Runtime Alignment and Length Conversion", Proceedings of the International Symposium on Code Generation and Optimization (CGO), 2005, 12 pages.

"Intel 64 and IA-32 Architectures Software Developer's Manual, vol. 1: Basic Architecture", Intel Corporation, Sep. 2008, http://download.intel.com/design/processor/manuals/253665.pdf, 496 pages. (23 pages submitted Herewith.).

U.S. Appl. No. 12/250,575, filed Oct. 14, 2008, Michael K. Gschwind.

U.S. Appl. No. 12/250,599, filed Oct. 14, 2008, Eichenberger et al.

U.S. Appl. No. 12/250,584, filed Oct. 14, 2008, Eichenberger et al.

U.S. Appl. No. 12/250,581, filed Oct. 14, 2008, Michael K. Gschwind.

Response to Final Office Action filed with the USPTO on Nov. 2, 2011 for U.S. Appl. No. 12/250,584, 19 pages.

USPTO U.S. Appl. No. 12/250,575.

USPTO U.S. Appl. No. 12/250,581.

USPTO U.S. Appl. No. 12/250,584.

USPTO U.S. Appl. No. 12/250,599.

Office Action mailed Aug. 17, 2012 for U.S. Appl. No. 12/250,581; 32 pages.

Kral, Stefan et al., "SIMD Vectorization of Straight Line FFT Code", Springer-Verlag Berlin Heidelberg 2003, Euro-Par 2003, LNCS 2790, pp. 251-260; http://users.ece.cmu.edu/~franzf/papers/europar03.pdf.

* cited by examiner

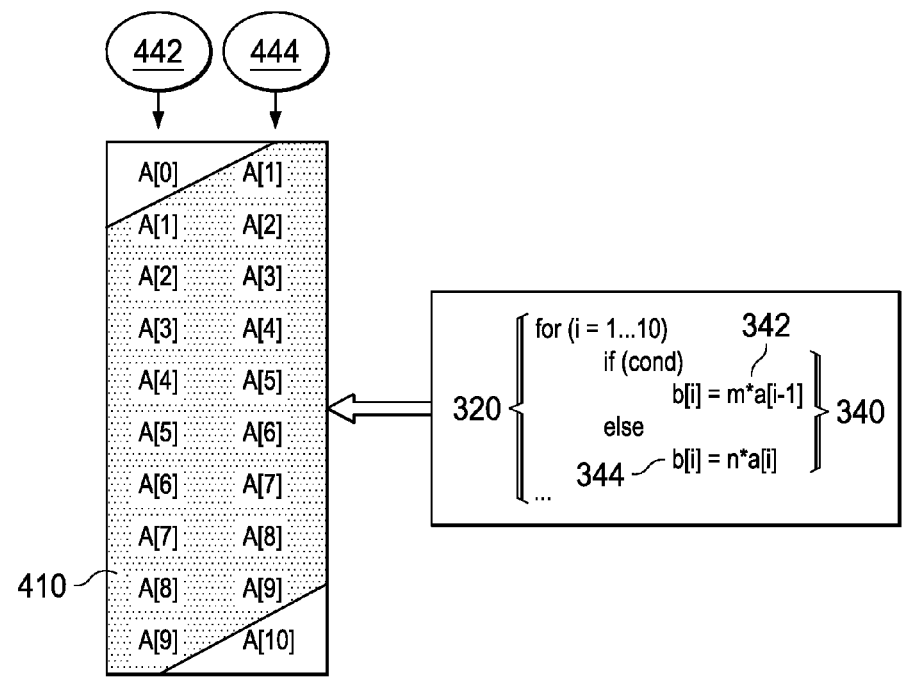

FIG. 9A
```
unsigned int i;
__attribute__((aligned(16))) double *a, *b, *d;
double m,n;

for (i=0; i<100; i++)
          if (d[i] > 0.0)
                  b[i] = m * a[i+2];
          else
                  b[i] = n * a[i];
```

FIG. 9B
```
unsigned int i;
__attribute__((aligned(16))) double *a, *b, *d;
double m,n;

for (i=0; i<2; i++)
          if (d[i] > 0.0)
                  b[i] = m * a[i+2];
          else
                  b[i] = n * a[i];

for (i=2; i<98; i++)
          if (d[i] > 0.0)
                  b[i] = m * a[i+2];
          else
                  b[i] = n * a[i];

for (i=98; i<100; i++)
          if (d[i] > 0.0)
                  b[i] = m * a[i+2];
          else
                  b[i] = n * a[i];
```

FIG. 9C

```
unsigned int i;
__attribute__((aligned(16))) double *a, *b, *d;
double m,n,t0,t1;

for (i=0; i<2; i++)
   if (d[i] > 0.0)
        b[i] = m * a[i+2];
   else
        b[i] = n * a[i];

for (i=2; i<98; i++){
  t0 = m * a[i+2];
  t1 = n * a[i];

b[i] = (d[i] > 0.0) ? t0 : t1;
} for (i=98; i<100; i++)
   if (d[i] > 0.0)
        b[i] = m * a[i+2];
else
        b[i] = n * a[i];
```

FIG. 9D

```
unsigned int i;
__attribute__((aligned(16))) double *a, *b, *d;
double m,n;
vector double vm, vn, vzero, vt0, vt1, vcond;

for (i=0; i<2; i++)
  if (d[i] > 0.0)
        b[i] = m * a[i+2];
  else
        b[i] = n * a[i];

vm = vec_splat(m);
vn = vec_splat(n);
vzero = vec_splat(0.0);

for (i=2; i<98; i+=2){
  vt0 = vec_mul(vm, *(vector double *)& a[i+2]);
  vt1 = vec_mul(vn, *(vector double *)& a[i]);
  vcond = vec_cmpgt(*(vector double *)& d[i], vzero);

*(vector double *)& b[i] = vec_sel(vt1, vt0, vcond);
} for (i=98; i<100; i++)
  if (d[i] > 0.0)
        b[i] = m * a[i+2];
  else
        b[i] = n * a[i];
```

ARRAY REFERENCE SAFETY ANALYSIS IN THE PRESENCE OF LOOPS WITH CONDITIONAL CONTROL FLOW

BACKGROUND OF THE INVENTION

1. Field of the Invention

The present application relates generally to an improved data processing apparatus and method and more specifically to a mechanism for array reference safety analysis in the presence of loops with conditional control flow.

2. Background of the Invention

Multimedia extensions (MMEs) have become one of the most popular additions to general-purpose microprocessors. Existing multimedia extensions can be characterized as Single Instruction Multiple Datapath (SIMD) units that support packed fixed-length vectors. The traditional programming model for multimedia extensions has been explicit vector programming using either (in-line) assembly or intrinsic functions embedded in a high-level programming language. Explicit vector programming is time-consuming and error-prone. A promising alternative is to exploit vectorization technology to automatically generate SIMD codes from programs written in standard high-level languages.

Although vectorization has been studied extensively for traditional vector processors decades ago, vectorization for SIMD architectures has raised new issues due to several fundamental differences between the two architectures. To distinguish between the two types of vectorization, the latter is referred to as SIMD vectorization, or SIMDization. One such fundamental difference comes from the memory unit. The memory unit of a typical SIMD processor bears more resemblance to that of a wide scalar processor than to that of a traditional vector processor. In the VMX instruction set found on certain PowerPC microprocessors (produced by International Business Machines Corporation of Armonk, N.Y.), for example, a load instruction loads 16-byte contiguous memory from 16-byte aligned memory, ignoring the last 4 bits of the memory address in the instruction. The same applies to store instructions.

There has been a recent spike of interest in compiler techniques to automatically extract SIMD parallelism from programs. This upsurge has been driven by the increasing prevalence of SIMD architectures in multimedia processors and high-performance computing. These processors have multiple function units, e.g., floating point units, fixed point units, integer units, etc., which can execute more than one instruction in the same machine cycle to enhance the uniprocessor performance. The function units in these processors are typically pipelined.

In performing compiler based transformations of loops to extract SIMD parallelism, it is important to ensure array reference safety. That is, during compilation of source code for execution by a SIMD architecture, the compiler may perform various optimizations including determining portions of code that may be parallelized for execution by the SIMD architecture. This parallelization typically involves vectorizing, or SIMD vectorizing, or SIMDizing, the portion of code. One such optimization involves the conversion of branches in code to predicated operations in order to avoid the branch misprediction penalties encountered by pipelined function units. This optimization involves converting conditional branches in source code to predicated code with predicate operations using comparison instructions to set up Boolean predicates corresponding to the branch conditions. Thus, the predicates, which now guard the instructions, either execute or nullify the instruction according to the predicate's value, a process called commonly referred to as "if-conversion."

In short, predicated code generated by traditional if-conversion generates straightline code by executing instructions from two mutually exclusive execution paths, suppressing instructions corresponding to one of the two mutually exclusive paths. It is quite common for one of these mutually exclusive execution paths to generate a variety of undesirable erroneous execution effects and, in particular, illegal memory references, when this path does not correspond to the chosen path. Accordingly, "if-conversion" might result in erroneous executions if it were not for the nullification of non-selected predicated instructions in accordance with "if-conversion", and in particular for memory reference instructions in if-converted code.

Gschwind et al., "Synergistic Processing In Cell's Multi-core Architecture", IEEE Micro, March 2006 introduces the concept of data-parallel if-conversion which is being increasingly widely adopted for compilation for data-parallel SIMD architectures. Unlike traditional scalar if-conversion, data-parallel if-conversion typically targets code generation with data-parallel select as supported by many SIMD architectures, as described in co-pending and commonly assigned U.S. Patent Application Publication No. US20080034357A1, filed Aug. 4, 2006, entitled "Method and Apparatus for Generating Data Parallel Select Operations in a Pervasively Data Parallel System" to Michael K. Gschwind, because data-parallel SIMD architectures typically do not offer predicated execution.

Thus, traditional if-conversion guards each instruction with a predicate indicating the execution or non-execution of each instruction corresponding to one or another of mutually exclusive paths. The data-parallel if-conversion with data-parallel select described in Gschwind et al. executes instructions from both paths without a predicate and uses data-parallel select instructions to select a result corresponding to an unconditionally executed path in the compiled code exactly when it corresponds to a taken path in the original source code. Thus, while data-parallel select can be used to implement result selection based on taken-path information, data-parallel if-conversion with data-parallel select is not adapted to nullify instructions. This is because a vector instruction may have one part of its result vector selected when another part of its result vector is not selected, making traditional instruction predication impractical.

Alas, lack of nullification of non-selected instructions means that execution sequences corresponding to non-selected mutually exclusive paths that may generate a variety of undesirable erroneous execution effects, and in particular illegal memory references, when this path does not correspond to the chosen path, are unconditionally executed and errors associated therewith are not nullified.

Specifically, without further safety checks a compiler may erroneously transform loops in non-SIMD code into a SIMD representation that may unintentionally cause array references to exceed the bounds of the arrays, e.g., make a reference above the range of array, resulting in unsafe memory accesses. Such unsafe memory accesses may cause a program to not operate properly and, in serious situations, may result in memory corruption, or even abnormal premature program termination (e.g., by attempting to access protected memory).

To avoid such undesirable program errors due to overly aggressive optimization, compilers may use array reference safety information to derive whether it is safe to generate code using data-parallel select sequences using data-parallel if-conversion based on arrays references found in the code sequences to be optimized. However, array safety information is often not available to a compiler, e.g., when arrays are dynamically created or defined in another module not available to the compiler for analysis. To ensure correct execution, in a loop nest with conditionals, when array reference safety cannot be established with current analysis techniques, the compiler limits the vectorizing, i.e., SIMD vectorizing, of loops where the array definitions are not known at compile time.

BRIEF SUMMARY OF THE INVENTION

In one illustrative embodiment, a method, in a data processing system, is provided for analyzing and optimizing loops with conditional control flow in source code based on array reference safety. The illustrative embodiments provide mechanisms for analyzing blocks of the source code to identify a conditional control flow loop having loop source code specifying a total access range for an array reference. A safe access range, of the total access range of the array reference in the loop source code, is identified over which a compiler-based optimization of the loop source code can be safely applied without introducing new exception conditions. The compiler-based optimization of the loop source code is performed based on the identified safe access range to generate optimized code. The optimized code is output for generation of executable code for execution on a processor.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE SEVERAL
VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 2A is an exemplary diagram illustrating a code loop in which an unsafe array reference is present;

FIG. 2B is an exemplary diagram of a code loop in which array references may be considered safe in accordance with the illustrative embodiments but would not be considered safe in previous compiler transformation techniques;

FIGS. 3A and 3B are exemplary diagram illustrating code loops having similar terms with slight differences;

FIG. 4 is an exemplary diagram illustrating the array references, for the example code loop shown in FIG. 3B, and indicates a set of references to array A which may be considered safe in accordance with one illustrative embodiment;

Figure 8:
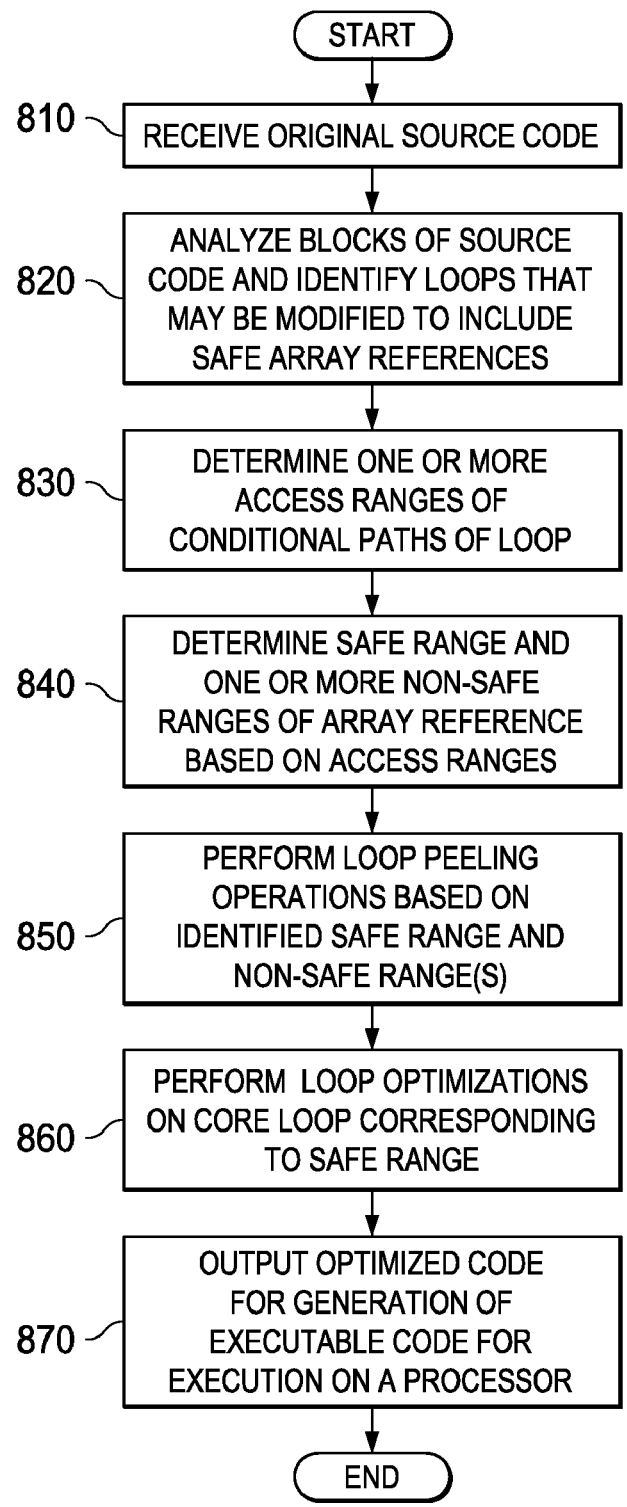

FIG. 8 is a flowchart outlining an exemplary array reference safety analysis and loop peeling operation in accordance with one illustrative embodiment; and FIGS. 9A, 9B, 9C and 9D show an exemplary program analysis and optimization flow employing the safety analysis techniques described herein and using the safety analysis to perform data-parallel if-conversion and data-parallel select code generation.

DETAILED DESCRIPTION OF THE INVENTION

The illustrative embodiments of the present invention provide a novel array safety analysis technique that may be used in conjunction with vectorization, and specifically SIMD vectorization, such that a wide body of codes may be successfully and safely SIMD vectorized even when array definition information is not available to the compiler. More specifically, the illustrative embodiments provide mechanisms for performing array reference safety analysis in the presence of loops with conditional control flow. The mechanisms of the illustrative embodiments are preferably implemented in conjunction with a compiler that transforms source code into code for execution on one or more processors capable of performing vectorized instructions, e.g., single instruction, multiple data (SIMD) instructions. One example of a data processing system in which SIMD capable processors are provided is the Cell Broadband Engine (CBE) available from International Business Machines Corporation of Armonk, N.Y. While the following description will assume a CBE architecture is used to implement the mechanisms of the illustrative embodiments, it should be appreciated that the present invention is not limited to use with the CBE architecture. To the contrary, the mechanisms of the illustrative embodiments may be used with any architecture in which array reference safety analysis may be used with transformations performed by a compiler. The CBE architecture is provided hereafter as only one example of one type of data processing system in which the mechanisms of the illustrative embodiments may be utilized and is not intended to state or imply any limitation with regard to the mechanisms of the illustrative embodiments.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
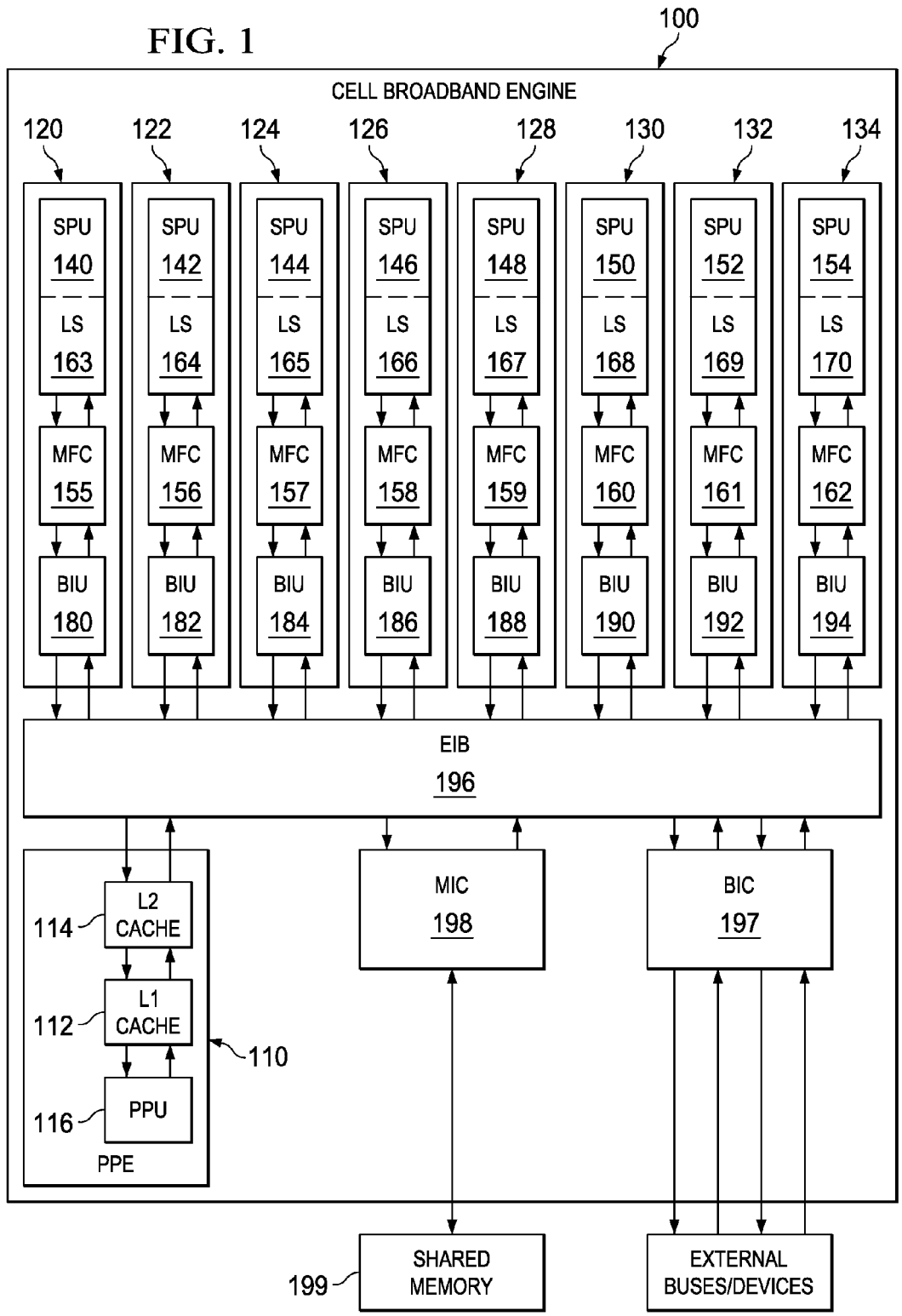
FIG. 1 is an exemplary block diagram of a data processing system in which exemplary aspects of the illustrative embodiments may be implemented.

FIG. 1 is an exemplary block diagram of a data processing system in which aspects of the present invention may be implemented. The exemplary data processing system shown in FIG. 1 is an example of the Cell Broadband Engine (CBE) data processing system. While the CBE will be used in the description of the preferred embodiments of the present invention, the present invention is not limited to such, as will be readily apparent to those of ordinary skill in the art upon reading the following description.

As shown in FIG. 1, the CBE 100 includes a power processor element (PPE) 110 having a processor (PPU) 116 and its L1 and L2 caches 112 and 114, and multiple synergistic processor elements (SPEs) 120-134 that each has its own synergistic processor unit (SPU) 140-154, memory flow control 155-162, local memory or store (LS) 163-170, and bus interface unit (BIU unit) 180-194 which may be, for example, a combination direct memory access (DMA), memory management unit (MMU), and bus interface unit. A high bandwidth internal element interconnect bus (EIB) 196, a bus interface controller (BIC) 197, and a memory interface controller (MIC) 198 are also provided.

The local memory or local store (LS) 163-170 is a non-coherent addressable portion of a large memory map which, physically, may be provided as small memories coupled to the SPUs 140-154. The local stores 163-170 may be mapped to different address spaces. These address regions are continuous in a non-aliased configuration. A local store 163-170 is associated with its corresponding SPU 140-154 and SPE 120-134 by its address location, such as via the SPU Identification Register, described in greater detail hereafter. Any resource in the system has the ability to read/write from/to the local store 163-170 as long as the local store is not placed in a secure mode of operation, in which case only its associated SPU may access the local store 163-170 or a designated secured portion of the local store 163-170.

The CBE 100 may be a system-on-a-chip such that each of the elements depicted in FIG. 1 may be provided on a single microprocessor chip. Moreover, the CBE 100 is a heterogeneous processing environment in which each of the SPUs may receive different instructions from each of the other SPUs in the system. Moreover, the instruction set for the SPUs is different from that of the PPU, e.g., the PPU may execute Reduced Instruction Set Computer (RISC) based instructions while the SPU executes vector instructions. In another aspect of the CBE architecture, the PPU supports the Power Instruction Set Architecture (ISA) data-parallel SIMD extensions, The SPEs 120-134 are coupled to each other and to the L2 cache 114 via the EIB 196. In addition, the SPEs 120-134 are coupled to MIC 198 and BIC 197 via the EIB 196. The MIC 198 provides a communication interface to shared memory 199. The BIC 197 provides a communication interface between the CBE 100 and other external buses and devices.

The PPE 110 is a dual threaded PPE 110. The combination of this dual threaded PPE 110 and the eight SPEs 120-134 makes the CBE 100 capable of handling 10 simultaneous threads and over 128 outstanding memory requests. The PPE 110 acts as a controller for the other eight SPEs 120-134 which handle most of the computational workload. The PPE 110 may be used to run conventional operating systems while the SPEs 120-134 perform vectorized floating point code execution, for example.

The SPEs 120-134 comprise a synergistic processing unit (SPU) 140-154, memory flow control units 155-162, local memory or store 163-170, and an interface unit 180-194. The local memory or store 163-170, in one exemplary embodiment, comprises a 256 KB instruction and data memory which is visible to the PPE 110 and can be addressed directly by software.

The PPE 110 may load the SPEs 120-134 with small programs or threads, chaining the SPEs together to handle each step in a complex operation. For example, a set-top box incorporating the CBE 100 may load programs for reading a DVD, video and audio decoding, and display, and the data would be passed off from SPE to SPE until it finally ended up on the output display. At 4 GHz, each SPE 120-134 gives a theoretical 32 GFLOPS of performance with the PPE 110 having a similar level of performance.

The memory flow control units (MFCs) 155-162 serve as an interface for an SPU to the rest of the system and other elements. The MFCs 155-162 provide the primary mechanism for data transfer, protection, and synchronization between main storage and the local storages 163-170. There is logically an MFC for each SPU in a processor. Some implementations can share resources of a single MFC between multiple SPUs. In such a case, all the facilities and commands defined for the MFC must appear independent to software for each SPU. The effects of sharing an MFC are limited to implementation-dependent facilities and commands.

The SPEs 120-134 of the CBE 100 use vector instructions, e.g., SIMD instructions, and thus, source code may be optimized by a compiler for execution on these SPEs 120-134, or PPU 116 with Power ISA SIMD extensions, by extracting parallelism from the source code and reconfiguring or transforming the source code to take advantage of this parallelism. In analyzing source code for optimization and transformation into SIMD vectorized code, the compiler may perform "if-conversion" operations. As part of the "if-conversion" operations, the compiler must determine whether array references are safe and thus, the "if-conversion" operation may be performed without introducing code that may generate new memory access exceptions. Typically, the compiler would require complete safety, i.e. no possibility of introducing any new exceptions. The illustrative embodiments utilize a number of characteristics of code to relax this requirement and thereby expand the types of code structures that may be subjected to "if" conversion than would otherwise be possible.

FIG. 2A is an exemplary diagram illustrating a code loop in which an unsafe array reference is present. As shown in FIG. 2A, the "if" conditional 210 in the "for" loop 220 of FIG. 2A includes a first conditional path in which when d[i] is greater than zero then the assignment b[i]=a[i] is performed, and a second conditional path in which when d[i] is not greater than zero then the assignment b[i]=0 is performed. In this case, the array reference a[i] may be unsafe because it can introduce new exceptions when "if" converted to a data-parallel select representation if the array reference a[i] refers to a pointer a[ ] which is the null pointer, or the array reference a[i] exceeds the range of the array a[ ], i.e., the value of i exceeds the range of the array. That is, if d[i] is greater than 0 and a[ ] is null, then an exception may be thrown. Similarly, if d[i] is greater than 0 and i exceeds the actual range of defined values in the array a[ ], then an exception may be thrown. For example, if the array a[ ] has a range of a[0] to a[999], but the value of "count" is 1,000, then it is possible that b[i]=a[i] may exceed the range of the array a[ ]. However, it is possible that the reference b[i]=a[i]=null or b[i]=a[1000] may never be encountered during operation if d[i] is less than or equal to 0 for corresponding values of i. Hence, while the "if" condition 210 and the "for" loop 220 in the code works as written in general, with regard to parallelization and array reference safety, the array reference a[i] is unsafe and cannot be converted to use data-parallel select when the definition of the array a[ ] is not available during "if" conversion using known mechanisms which require 100% array reference safety. This is because the compiler cannot know at compile time which branch will be taken and thus, must be conservative to only perform if conversion where it is certain that there is 100% array reference safety.

These known mechanism ignore and are otherwise not aware of the fact that, for the majority of the range of the array a[ ], the array reference a[i] is safe. Moreover, these known mechanisms ignore and are otherwise not aware of the observation that "if" conversion can be performed when the conversion does not result in code that introduces any "new" exceptions. That is, if the array reference a[i] will be encountered regardless of the path taken in the "if" condition 210 of the "for" loop, then it is not unsafe to perform if conversion and thereby pre-fetch the array references a[i] as part of code using data-parallel select since no "new" exceptions will be encountered, i.e. an exception, if any, would be encountered regardless of which path is taken. The illustrative embodiments make use of these observations to provide a mechanism for array reference safety analysis that is more relaxed than known compiler array reference safety checking mechanisms and thus, allows a larger amount of code to be optimized using "if" conversion and other optimizations that take advantage of parallelism in processor architectures.

FIG. 2B is an exemplary diagram of a code loop in which array references may be considered safe in accordance with the illustrative embodiments but would not be considered safe in previous compiler transformation techniques. As shown in FIG. 2B, in this example, the array reference a[i] appears in both paths of the "if" condition 230. Since both paths of the "if" condition 230 contain the array reference a[i], both paths are equally safe, or unsafe. Thus, moving this array reference outside of the "if" condition 230, or even outside of the "for" loop 240, i.e., performing a predicate operation transformation of the "if" condition 230, would not make the array references a[i] any more unsafe or introduce additional exceptions that otherwise are not present in the original code.

The illustrative embodiments expand the range of source code that can be considered reasonably safe for if conversion and other compiler optimizations. This expansion is due to a context-sensitive approach, wherein the analysis does not determine if a reference a[i] to an array is safe regardless of location, but rather if a reference to a[i] will introduce new exceptions in loops having conditional control flow. With the mechanisms of the illustrative embodiments, an array reference is considered safe if its unconditional insertion into a loop does not introduce any exceptions not previously present in application code. It should be noted that this does not mean that the array reference is safe in an arbitrary location, nor that no exception will be raised, since it is still possible that the array reference may result in an invalid result being encountered and an exception thrown, but rather that an exception associated with this reference was already present in the original loop nest of the source code program, possibly at another location. These conditions of the illustrative embodiments simply mean that if these conditions are met, then performing the compiler optimizations, such as if conversion, will not result in additional new exceptions being introduced by these compiler optimizations into the optimized code that would not otherwise have been generated.

Using these conditions, the illustrative embodiments provide mechanisms for analyzing loops with conditional control flow to identify loops that meet these conditions and then transform these loops based on a recognition of the array reference portions of the array in the branches of the loop that can be determined to be safe and the array reference portions of the array that cannot be determined to be safe. Essentially, the mechanisms of the illustrative embodiments first identify candidate loops for vectorization, e.g., candidate blocks of code for if conversion, based on whether one or more of their array references meet one or more of the criteria set forth above, i.e., ensure that a reference is unconditionally inserted during if conversion when such a reference is already present during all executions.

In accordance with one embodiment, an array reference can be established to be safe to be inserted, when (1) in all alternate paths to be if-converted the reference is present, or (2) when all paths ending in or starting with the insertion point contain the array reference, or a range containing that array reference under a contiguous array allocation assumption, or (3) when all paths starting with the insertion point contain a first array reference and all paths ending in the insertion point contain a second array reference, such that the reference to be inserted is within an array range established by the first and second reference, under a contiguous array allocation assumption. Typically, and consistent with common program usage, arrays can be considered to be contiguous, i.e., if first and second array references a[i] and a[k] are legal references, then all references a[j], wherein $i \leq j \leq k$, are legal references.

In accordance with one illustrative embodiment, for each array reference, an access range and a safe range within the access range are identified based on paths through a loop. The loop may then be transformed based on the identified access range and safe range, e.g., iterations corresponding to the safe range are extracted by performing loop peeling operations to "extract" the portions of the access range that cannot be proven to be safe. These extracted portions are then handled separately from the core portion of the access range that can be proven to be safe. It is this core portion of the access range that may then be optimized through vectorization techniques, such as if conversion or the like, while the extracted portions may remain unoptimized with regard to these optimization techniques. Those skilled in the art will understand that an insertion point can be either considered to be before the if conversion candidate conditional expression, or after safe if conversion candidate conditional expression.

Referring now to loop structures commonly used in programs, many loops use array references which are affine. In simplest terms, a one-dimensional array index is affine if it can be written in the form $x*i+y$, where x and y are constants and i is the loop index variable. The index of a multidimensional array is affine if the index in each dimension is affine.

In one aspect of the present invention, affine indices are considered with respect to loops. In one illustrative embodiment, only strictly affine loops are considered. In another illustrative embodiment, only affine references with stride 1 are considered.

In one illustrative embodiment, the range of loops to be considered is extended to quasi-affine references of the form $x*i+y$, where x and y are constant with respect to a loop being considered and where i is the associated loop index variable. In yet another illustrative embodiment, affine references considered include non-affine multidimensional references which are affine with respect to a dimension i, which we define as being representable in the form $x(j)*i+y(j)$ such that $x(j)$ and $y(j)$ are a function of an index j, and wherein $x(j)$ and $y(j)$ are independent of the affine index variable i and where i is the associated loop index variable of a loop being considered. Those skilled in the art will further understand that the above multiplier x, or multiplier $x(j)$, corresponds to the stride value of a reference pattern.

In one embodiment, the methods contained herein may be performed in conjunction with other known loop optimizations, such as including, but not limited to, loop splitting, to extract a first set of if-conversion candidates that may be safely if-converted, and a second set of if-conversion candidates for which such safety cannot be established.

The mechanisms of the illustrative embodiments are especially well utilized in situations where the same terms, either identically or with slight differences, appear in the various paths of a conditional control flow loop, such as a "for" loop with "if" conditionals within the "for" loop. Such similar terms tend to overlap with regard to the array reference ranges and as a result, a safe region of the array references may be determined and portions of the array references that cannot be considered safe may likewise be determined.

FIGS. 3A and 3B are exemplary diagrams illustrating code loops having similar code with slight differences and representative of many similar scientific loop-oriented codes. As shown in FIGS. 3A and 3B, loops 310 and 320 have two references to arrays a[ ] and b[ ]. References to array b[ ], in if conversion candidate conditional statements 330 and 340 of loops 310 and 320, respectively, meet condition (1) of above, as do references in array a[ ] if conversion candidate conditional statement 330 of loop 310.

Referring now to references to a[ ] of if conversion candidate conditional statement 340 of loop 320, if conversion of conditionally executed statement 342 will lead to the unconditional insertion of a memory read-access reference to a[i−1] at an insertion point, assumed here to be prior to if-conversion candidate 340. In accordance with one illustrative embodiment, for iteration i=2, the insertion point for an unconditional reference to a[1] corresponding to statement 342 in iteration i=2 follows paths corresponding to iteration i=1 corresponding to a cond(1) of either true with a reference to a[0], or false with a reference to a[1]. Furthermore, for iteration i=2, the insertion point for an unconditional reference to a[1] corresponding to statement 342 in iteration i=2, is followed by paths that all summarily contain references corresponding to iteration i=10 corresponding to a cond(10) of either true with a reference to a[9], or false with a reference to a[10]. Consequently, a[1] is safe because it falls into all possible ranges of a[0] . . . a[9], a[0] . . . a[10], a[1] . . . a[9] and a[1] . . . a[10].

Similar considerations apply for iterations i=3 through i=10, all of which follow paths containing iteration and are followed by paths containing iteration i=10. However, it should be noted that, for iteration i=1, the insertion of unconditional access of a[0] (before the if conversion candidate 340) is not preceded by paths that define starting points for appropriate access ranges including a[0] in the various combinations, nor is it followed by paths that create such ranges, or contain a reference to a[0], on all paths ending at the insertion point, or starting at said insertion point.

Referring now to if conversion of conditionally executed statement 344, if conversion of this statement 344 will lead to the unconditional insertion of a memory read-access reference to a[i] at an insertion point, assumed here to be prior to if-conversion candidate 340. In accordance with one illustrative embodiment, for iteration i=2, the insertion point for an unconditional reference to a[2] corresponding to statement 344 in iteration i=2 follows paths corresponding to iteration i=1 corresponding to a cond(1) of either true with a reference to a[0], or false with a reference to a[1]. Furthermore, for iteration i=2, the insertion point for an unconditional reference to a[2] corresponding to statement 344 in iteration i=2 is followed by paths which all summarily contain references corresponding to iteration i=10, corresponding to a cond(10) of either true with a reference to a[9], or false with a reference to a[10]. Consequently, a[2] is safe because it falls into all possible ranges of a[0] . . . a[9], a[0] . . . a[10], a[1] . . . a[9] and a[1] . . . a[10].

Similar considerations apply for iterations i=3 through i=9, all of which are preceded by paths containing iteration i=1 and are followed by paths containing iteration i=10. However, it should be noted that for iteration i=10 the insertion of unconditional access of a[10] (before the if conversion candidate 340) is not followed by paths that create appropriate ranges including a[10] in the various combinations, nor does it follow paths that create such ranges, or contain a reference to a[10], either ending in, or starting at, the insertion point of the unconditional access.

Finally, and referring to a possible unconditional insertion of a[i] corresponding to a conditionally executed statement 344 to be if-converted, and corresponding to the execution of iteration i=1 for the subject loop, the insertion point is followed paths containing the ranges of a[0] . . . a[9], a[0] . . . a[10], a[1] . . . a[9] and a[1] . . . a[10], thereby making this a safe insertion. However, this is not the case for reference a[0] of conditionally executed statement 342, making the unconditional execution of this access unsafe.

Based on these considerations, and based on the safety analysis presented herein, if-conversion of conditional sequence 340 is safe for iterations i=2 to i=9, because it is safe with respect to both conditionally executed statements 342 and 344 with respect to references to array a[ ]. Based on these considerations, and based on the safety analysis presented herein, if-conversion of conditional sequence 340 is unsafe for iteration i=1 because it is unsafe with respect to conditionally executed statement 342 with respect to the reference a[i−1]. Furthermore, based on these considerations, and based on the safety analysis presented herein, if-conversion of conditional sequence 340 is unsafe for iteration i=10 because it is unsafe with respect to conditionally executed statement 344 with respect to the reference a[i].

In one illustrative embodiment, additional array reference safety analyses are performed in addition to the method taught herein and the combination of the multiple analysis methods may establish the safety of additional iterations, e.g., such as those present in iterations corresponding to i=1 and i=10 contained hereinabove.

FIG. 4 is an exemplary diagram illustrating the array references, for the example code loop shown in FIG. 3B, which may be considered safe in accordance with one illustrative embodiment. Table 410 shows references 442 and 444 corresponding to conditionally executed statements 342 and 344 in FIG. 3B, respectively, and indicates their safety with respect to the analysis performed in conjunction with the discussion of FIG. 3B.

As can be seen, since a[0] and a[10] are only encountered in some of the possible execution paths, and specifically an execution scenario referencing only memory addresses in the range a[1] . . . a[9], references to a[0] and a[10] cannot be inferred to be safe, as demonstrated in the exposition above. However, since the array references a[1:9] may be encountered regardless of which path is taken, this portion of the access range of the array a[ ] may be regarded as safe.

The safe portion of the access range is shown in FIG. 4 as the shaded region 410. It can be seen that this shaded region does not include the border or edge array references of a[0] and a[10] which, as noted above, cannot be proven to be safe. Again, it should be kept in mind here that "safe" in the context of the illustrative embodiments does not mean that there is absolutely no possibility that an invalid result will be encountered, but rather that the compiler, when performing optimizations such as if-conversion, will not introduce new sources of exceptions by performing such optimizations, i.e., it is "safe" to perform the compiler optimizations without the risk of introducing new sources of exceptions. It should be furthermore noted that while the present analysis cannot infer the safety of references a[0] and a[10], other methods for inferring the safety of these references may be employed, and the illustrative embodiments of the present invention may be performed in conjunction with other safety analysis methods.

Figure 5A:
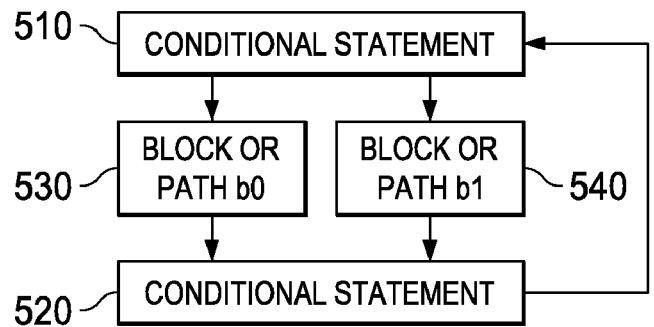
FIG. 5A is a block diagram representation of an exemplary code loop in accordance with one illustrative embodiment.
Figure 5B:
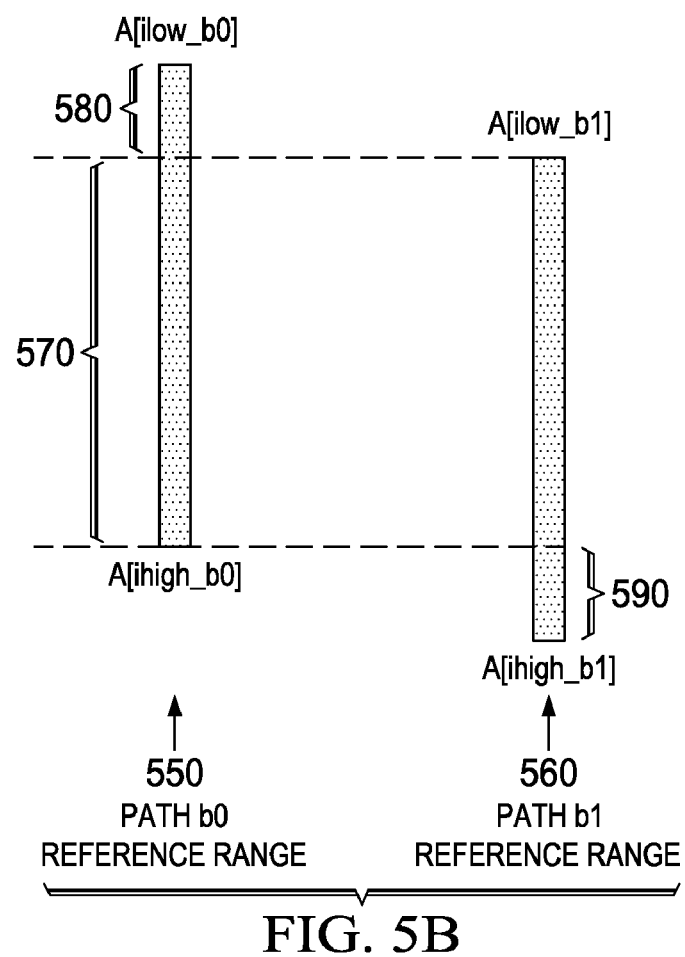
FIG. 5B is a graphical representation of reference ranges and corresponding ranges of safe array references in accordance with one illustrative embodiment.

To illustrate this situation in a more general manner, FIG. 5A is a block diagram representation of an exemplary code loop in accordance with one illustrative embodiment. FIG. 5B is a graphical representation of reference ranges and corresponding ranges of safe array references in accordance with one illustrative embodiment. As shown in FIG. 5A, the exemplary code loop 500 has two conditional statements 510 and 520 with two paths b0 530 and b1 540 being possible paths of execution within the code loop 500. It is assumed for purposes of this example that both paths b0 530 and b1 540 contain affine references to an array A[ ].

As shown in FIG. 5B, the path (or block) b0 530 has a first access range 550 from a first access A[ilow_b0] to a last access A[ihigh_b0]. Similarly, the path (or block) b1 540 has a second access range 560 from a first access A[ilow_b1] to a last access A[ihigh_b1]. The two ranges 550 and 560 overlap in the area 570, bounded by A[ilow_b1] and A[ihigh_b0], which is the area considered to be safe in accordance with the illustrative embodiments. The area 580 bounded by A[ilow_b0] and A[ilow_b1], and the area 590 bounded by A[ihigh_b0] and A[ihigh_b1], represent the areas where the array references cannot be determined to be safe.

While FIG. 5B demonstrates ascending accesses, in accordance with another illustrative embodiment a similar optimization is performed when both access ranges refer to descending references from first accesses A[ihigh_b0] and A[ihigh_b1] to last accesses A[ilow_b0] and A[ilow_b1].

In another aspect of the illustrative embodiments, references to the same array may be separately analyzed for read and write safety when targeting systems offering separate read and write access permissions. In accordance with one illustrative embodiment, only read accesses are considered for determining read access safety, and only write accesses are considered for determining write access safety. In accordance with another illustrative embodiment, read and write accesses are considered for determining read access safety, and only write accesses are considered for determining write access safety.

In yet another aspect of the illustrative embodiments, and in accordance with the teachings contained herein, the analysis and optimizations described herein can be applied multiple times. In one illustrative embodiment, if the code contains a multiple-condition evaluation with multiple paths, the optimizations described herein can be performed by considering more than two alternative paths, e.g., those including mutually exclusive execution blocks b0, b1 and b2.

The mechanisms of the illustrative embodiments may be implemented as part of a compiler analysis engine which identifies these safe areas of array references in loops with conditional control flows, i.e., conditional control flow loops. As mentioned above, this analysis engine of the compiler may identify blocks or portions of code that are candidates for loop optimizations, such as if conversion. Then, for each array reference within each block, the analysis engine may identify an access range for that reference within the block, i.e. $AR_{Bi}=$ [low ... high]. Based on the access ranges $AR_{Bi}$ of reference in the various blocks Bi that are candidates for optimization, a safe range of array references may be determined as a range spanning the maximum of the lowest access in the access ranges $AR_{Bi}$ of the blocks to the minimum of the highest access in the access ranges $AR_{Bi}$, i.e. $SR=[\max(\text{low}_{Bi}) \ldots \min(\text{high}_{Bi})]$. The assumption when determining this safe range SR is that if two array references, e.g., $\max(\text{low}_{Bi})$ and $\min(\text{high}_{Bi})$, can be determined to be safe, then array references between these two array references may be assumed to be safe as well without having to check each intervening array reference for safety, i.e. given safe(a[i]) and safe(a[k]) and $i \leq j \leq k$, then safe(a[j]). Having identified the access ranges and the safe range, loop peeling with regard to the array reference is then performed based on the access ranges and the safe range.

Figure 6:
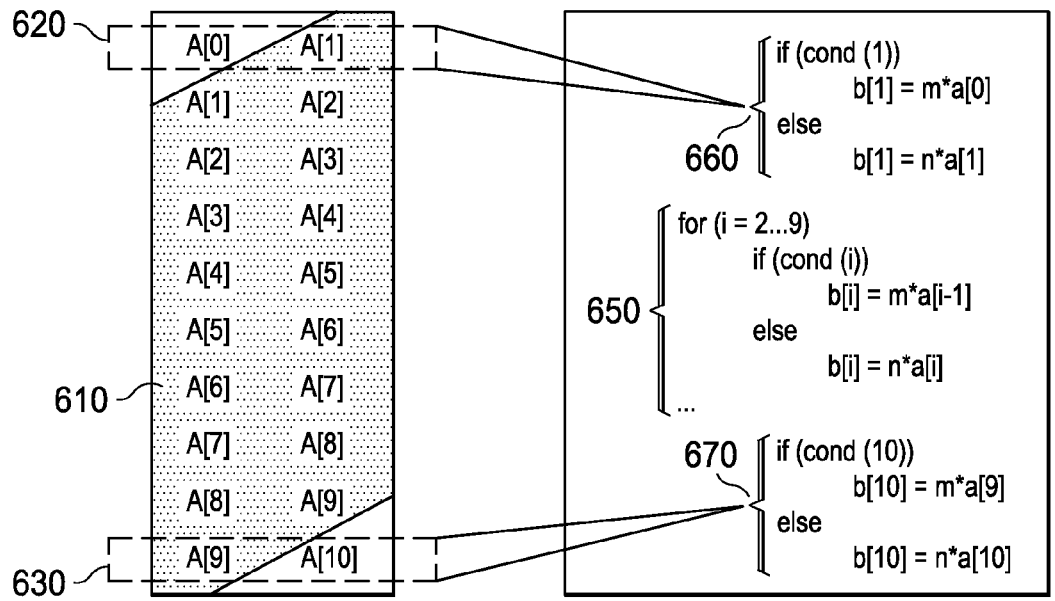
FIG. 6 illustrates a loop peeling operation that may be performed by a compiler in accordance with the illustrative embodiments and the correlation of the portions of the loop to portions of an access range of the array A[ ]

FIG. 6 illustrates a loop peeling operation that may be performed by a compiler in accordance with the illustrative embodiments and the correlation of the portions of the loop to portions of an access range of the array A[ ]. The original code that is subjected to the safety analysis and loop peeling operations of the compiler in the example shown in FIG. 6 is the code shown in FIG. 3B. As discussed above, through the safety analysis of the illustrative embodiments, the portions of the access ranges of the array reference A[i] and A[i−1], a safe range of A[1:9] 610 is identified and portions A[0] 620 and A[10] 630 cannot be determined to be safe. Thus, during loop peeling operations, as shown in FIG. 6, the portions A[0] 620 and A[10] 630, that cannot be shown to be safe, are extracted from the "for" loop and treated separately. Meanwhile, the safe range 640 remains in the "for" loop, as core loop 650, and may be subjected to compiler optimizations such as if conversion or the like.

In the depicted example, the if condition of "if (cond(1))" 660 corresponding to portion A[0] 620 is extracted. The portion A[0] 620 includes both A[0] and A[1] because of the two paths or branches in the original if condition which are replicated in the if condition 660. Similarly, the if condition of "if(cond(10))" 670 corresponding to portion A[10] 630 is also extracted. This portion A[10] 630 includes both A[9] and A[10] because of the two paths or branches in the original if condition which are replicated in the if condition 670.

Having peeled off the portions 660 and 670 of the for loop that correspond to possible references 620 and 630 that cannot be determined to be safe, and leaving the core loop 650 having array references that can be determined to be relatively safe for compiler optimization (references 610), the compiler may then perform standard optimizations, such as if conversion, on the core loop 650. While the other portions 660 and 670 may be optimized in other ways, at least one of the loop optimizations, e.g., if conversion, applied to the core loop 650 cannot be applied to the other portions 660 and 670. Thus, the core loop 650 is optimized in a different manner from that of the other portions 660 and 670 by virtue of the extraction of the core loop 650 and the peeling off of the other portions 660 and 670 with potentially unsafe references 620 and 630. While the example demonstrated in FIG. 6 requires the peeling of 1 iteration corresponding to the beginning and end of loop execution, in some execution scenarios, multiple iterations may need to be peeled.

In accordance with one illustrative embodiment for loop safety analysis targeted at affine array references, the number of iterations to be peeled at the beginning of a loop, when block 530 b0 of FIG. 5A contains an affine reference $x_{b0}*i+y_{b0}$ and block 540 b1 of FIG. 5A contains an affine reference $x_{b1}*i+y_{b1}$, is determined by the function $\max((y_{b0}-y_{b1})/x_{b0}, (y_{b1}-y_{b0})/x_{b1})$ when the first iteration uses i=0. More specifically, the number of iterations may be determined using the function $\text{ceiling}(\max((y_{b0}-y_{b1})/x_{b0}, (y_{b1}-y_{b0})/x_{b1}))$ where the ceiling function is defined in accordance with its mathematically defined use to round up.

Those skilled in the art will understand, based on the disclosure herein, how to apply the teachings contained herein to code scenarios where the first iteration does not use index i=0. In accordance with one illustrative embodiment to support loops where the first iteration does not use index i=0, analysis is performed by substituting new affine indices $x_{b0}*i'+y_{b0}'$ wherein $i'=i-i_{MIN}$ and $y_{b0}'=x_{b0}*i_{MIN}+y_{b0}'$ and $x_{b1}*i'+y_{b1}'$ wherein $i'=i-i_{MIN}$ and $y_{b1}'=x_{b1}*i_{MIN}+y_{b1}'$ and $i_{MIN}$ corresponds to the initial value of the first iteration of i.

Similarly, in accordance with an embodiment for loop safety analysis targeted at affine array references, the number of iterations to be peeled at the end of a loop, when block 530 b0 of FIG. 5A contains an affine reference $x_{b0}*i+y_{b0}$ and block 540 b1 of FIG. 5A contains an affine reference $x_{b1}*i+y_{b1}$, is defined by the function $\max(((x_{b1}*i_{MAX}+y_{b1})-((x_{b0}*i_{MAX}+y_{b0}))/x_{b0}, ((x_{b0}*i_{MAX}+Y_{b0})-(((x_{b1}*i_{MAX}+y_{b1}))/x_{b1})$, where $i_{MAX}$ represents the maximum loop index i occurring in the last iteration of the loop. More specifically, the number of iterations may be determined based on the function $\text{ceiling}(\max(((x_{b1}*i_{MAX}+y_{b1})-(((x_{b0}*i_{MAX}+y_{b0}))/x_{b0}*i_{MAX}+y_{b0})-(((x_{b1}*i_{MAX}+y_{b1}))/x_{b1})$ where the ceiling function is defined in accordance with its mathematically defined use to round up.

Figure 7:
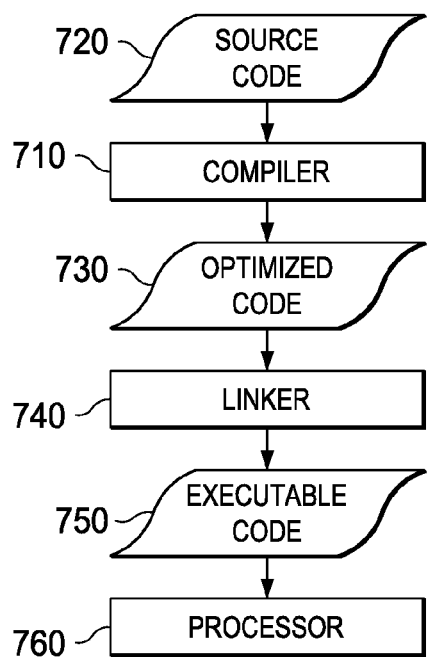
FIG. 7 is an exemplary block diagram of a compiler in accordance with one illustrative embodiment.

FIG. 7 is an exemplary block diagram of a compiler in accordance with one illustrative embodiment. As shown in FIG. 7, the compiler 710 receives original source code 720 which is analyzed in accordance with the illustrative embodiments for which the compiler 710 is configured. That is, the compiler 710 identifies portions of the source code 720 that have loops with conditional control flow that may be modified such that at least a portion of the loop may be considered safe for compiler optimization with regard to an array reference. For example, the condition for determining whether a loop with conditional control flow may be modified to have at least a portion of the loop to be considered safe may be a condition in accordance with the discussion of FIG. 5B. Computing the number of iterations to be peeled may be done either by explicit enumeration as shown in FIG. 6, or by computing the number of iterations to be peeled for affine indices as discussed above.

The compiler 710 then determines access ranges for alternate paths in a loop and, based on these access ranges, a safe range of array references for which a compiler loop optimization may be applied without introducing new sources of exceptions. The compiler 710 may then transform the source code 720 to have separate code for handling the safe range and identified unsafe ranges, or ranges within the access ranges that cannot be proved to be safe. The code for handling the safe range is then optimized by the compiler using loop optimization techniques, such as if conversion, which cannot be applied to the unsafe ranges. The result is optimized code 730 that implements the optimizations of the illustrative embodiments. The optimized code 730 is then provided to linker 740 that performs linker operations, as are generally known in the art, to thereby generate executable code 750. The executable code 750 may then be executed by the processor 760, which may be a processor in the CBE 100 of FIG. 1, for example, or another data processing system architecture.

FIG. 8 is a flowchart outlining an exemplary array reference safety analysis and loop peeling operation in accordance with one illustrative embodiment. The operation outlined in FIG. 8 may be implemented by a compiler, such as compiler 710 in FIG. 7, executing in a data processing system, such as data processing system 100 in FIG. 1, for example. It should be appreciated that the portions of the operations outlined in FIG. 7 may be implemented in hardware, software, or any combination of hardware and software.

As shown in FIG. 8, the operation starts with receiving original source code (step 810). Blocks of the original source code are analyzed to identify a loop with conditional control flow that may be modified such that at least a portion of the loop may be considered safe for compiler optimization with regard to an array reference (step 820). The compiler determines one or more access ranges of conditional paths of the loop with regard to the array reference (step 830). The compiler then determines, based on the one or more access ranges, a safe range and one or more non-safe ranges of the array reference (step 840). Again, a non-safe range is a range of array references that cannot be proven to be safe. This does not mean that this range is actually unsafe, but simply cannot be proven to be safe. Similarly, the safe range is a range that may be considered safe in that compiler optimizations, such as if conversion, will not introduce new sources of exceptions. This does not mean that this range will not cause an exception to be thrown, but only that the optimization performed by the compiler will not introduce new exceptions.

Having identified the safe and non-safe ranges, the compiler peels off portions of the loop corresponding to the one or more non-safe ranges of the array reference to thereby generate a safe loop corresponding to the safe range of the array reference (step 850). Thereafter, the compiler performs one or more compiler optimizations on the safe loop to generate optimized code (step 860). These compiler optimizations may include, for example, if conversion to generate vectorized code, or SIMD code, for execution by a vector or SIMD processor. The compiler then outputs the optimized code for generation of executable code for execution on a processor (step 870). The operation then terminates.

FIGS. 9A-9D show an exemplary program analysis and optimization flow employing the safety analysis techniques described herein and using the safety analysis to perform data-parallel if-conversion and data-parallel select code generation. As shown in FIGS. 9A-9D, exemplary code fragments are provided that demonstrate the transformations described herein in conjunction optimizations enabled thereby. FIG. 9A demonstrates original source code received by a compiler, such as in step 810 of FIG. 8, for example. FIG. 9B demonstrates modified code in accordance with safety analysis and loop peeling transformations in accordance with one illustrative embodiment, using affine references and peeling computed based on $y_0=2$ and $y_1=0$ and $x_0=x_1=1$ and $i_{MAX}=99$. FIG. 9C demonstrates if-converted code based on select0-based code generation in accordance with one illustrative embodiment. FIG. 9D demonstrates SIMD vectorized code based on SIMD vectorization of the code in FIG. 9C, i.e., the result of data-parallel if conversion with data-parallel select, in accordance with one illustrative embodiment.

The exemplary code in FIGS. 9A-9D is generally based on vector intrinsics notation such as commonly used for VMX, VMX128, and VSX architectures. In accordance with this definition, specific vector operation types are selected by the vector intrinsic operand type. In accordance with the exemplary code sequence, the presence of vector intrinsic support for vectors with double precision floating point data types is assumed. In accordance with the exemplary code sequences, semantics are set forth herein and are as follows: vec_splat replicates a single input element to create a vector of the associated vector data type. The operation vec_mul multplies, elementwise, two vectors and generates an output vector. The operation vec_cmpgt compares two vectors and generates a vector condition mask for use with the data parallel select vec_select which chooses, for each element of the output vector, one of the corresponding two elements in the first two input arguments based on the corresponding element in the vector condition mask of the third argument.

There is also provided an alignment attribute to convey 16 byte alignment of vectors a,b,d, but no other safety information. Those skilled in the art will understand that when such alignment information is not present additional transformations, for handling vectors with unknown alignment may be performed as part of the SIMD vectorization transformation.

Thus, the illustrative embodiments provide mechanisms for analyzing blocks of code to identify loops with conditional control flow that may be modified such that at least a portion of the loop may be considered safe for compiler optimization with regard to an array reference. The access ranges of the conditional paths of the loop with regard to the array may be determined and, based on these access ranges, a safe range may be identified and one or more non-safe ranges may be identified. The one or more portions of the loop corresponding to the non-safe ranges are peeled off of the loop using a loop peeling operation and are treated separately in the modified code from the portion of the loop corresponding to the safe range. The safe range may then be optimized by the compiler using loop optimization operations. The resulting optimized code may then be output for use in generating executable code for execution on a vector processor, such as a SIMD processor.

As noted above, it should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for optimizing loops with conditional control flow in source code based on array reference safety, comprising:
   analyzing blocks of the source code to identify a conditional control flow loop having loop source code specifying a total access range for an array reference,
   identifying a safe access range, of the total access range of the array reference in the loop source code, over which a compiler-based optimization of the loop source code can be safely applied without introducing new exception conditions;
   performing the compiler-based optimization of the loop source code based on the identified safe access range to generate optimized code; and
   outputting the optimized code for generation of executable code for execution on a processor, wherein identifying the safe access range of the total access range of the array reference in the loop source code comprises:
   determining a first access range of the array reference over which the loop source code is safe for the compiler-based optimization of the loop source code;
   determining a second access range of the array reference over which the loop is unsafe for the compiler-based optimization of the loop source code; and
   performing the compiler-based optimization of the loop source code based on the identification of the first access range and second access range, and wherein determining a first access range of the array reference over which the loop is safe for the compiler-based optimization comprises determining an access range of the array reference that is encountered regardless of which conditional path of the loop is taken when the source code is executed.

2. The method of claim 1, wherein the compiler-based optimization is "if" conversion of the loop source code.

3. The method of claim 2, wherein determining a first access range of the array reference over which the loop is safe for the compiler-based optimization comprises determining an access range of the array reference for which "if" conversion will not introduce any new exceptions.

4. The method of claim 1, wherein performing the compiler-based optimization of the loop source code based on the identified first access range and second access range to generate optimized code comprises:
   peeling off portions of the loop source code corresponding to the second access range of the array reference to thereby generate safe loop code corresponding to the first access range of the array reference; and
   performing the compiler-based optimization on the safe loop code, wherein the compiler-based optimization is not performed on peeled-off portions of the loop source code corresponding to the second access range.

5. The method of claim 1, wherein identifying a safe access range, of the total access range of the array reference in the loop source code, over which a compiler-based optimization of the loop source code can be safely applied without introducing new exception conditions comprises determining the safe access range based on whether the array reference meets one or more of the following criteria:
   the array reference appears in all conditional paths of the loop source code;
   the array reference is contained in all conditional paths ending in or starting at an insertion point of the array reference in the loop source code; or
   all conditional paths starting at the insertion point contain a first array reference and all conditional paths ending in the insertion point contain a second array reference, such that the array reference inserted at the insertion point is within an array range established by the first and second reference.

6. The method of claim 1, further comprising:
   generating executable code based on the optimized code; and
   executing the executable code on a processor of the data processing system.

7. The method of claim 1, wherein the safe access range is determined as corresponding to an access range where a lowest value corresponds to a maximum of a lowest reference of each of a plurality of possible access ranges corresponding to different paths through the loop, and wherein a highest value in the safe range corresponds to a minimum of a highest reference of each of the plurality of possible access ranges corresponding to the different paths through the loop.

8. The method of claim 7, wherein the references are affine references.

9. A computer program product comprising a computer readable storage medium having a computer readable program recorded thereon, wherein the computer readable program, when executed on a computing device, causes the computing device to:
   analyze blocks of source code to identify a conditional control flow loop having loop source code specifying a total access range for an array reference,
   identify a safe access range, of the total access range of the array reference in the loop source code, over which a compiler-based optimization of the loop source code can be safely applied without introducing new exception conditions;
   perform the compiler-based optimization of the loop source code based on the identified safe access range to generate optimized code; and
   output the optimized code for generation of executable code for execution on a processor, wherein the computer readable program causes the computing device to identify the safe access range of the total access range of the array reference in the loop source code by:

determining a first access range of the array reference over which the loop source code is safe for the compiler-based optimization of the loop source code;

determining a second access range of the array reference over which the loop is unsafe for the compiler-based optimization of the loop source code; and performing the compiler-based optimization of the loop source code based on the identification of the first access range and second access range, and wherein determining a first access range of the array reference over which the loop is safe for the compiler-based optimization comprises determining an access range of the array reference that is encountered regardless of which conditional path of the loop is taken when the source code is executed.

10. The computer program product of claim 9, wherein the compiler-based optimization is "if" conversion of the loop source code.

11. The computer program product of claim 10, wherein the computer readable program causes the computing device to determine a first access range of the array reference over which the loop is safe for the compiler-based optimization by determining an access range of the array reference for which "if" conversion will not introduce any new exceptions.

12. The computer program product of claim 9, wherein the computer readable program causes the computing device to perform the compiler-based optimization of the loop source code based on the identified first access range and second access range to generate optimized code by:

peeling off portions of the loop source code corresponding to the second access range of the array reference to thereby generate safe loop code corresponding to the first access range of the array reference; and performing the compiler-based optimization on the safe loop code, wherein the compiler-based optimization is not performed on peeled-off portions of the loop source code corresponding to the second access range.

13. The computer program product of claim 9, wherein the computer readable program causes the computing device to identify a safe access range, of the total access range of the array reference in the loop source code, over which a compiler-based optimization of the loop source code can be safely applied without introducing new exception conditions by determining the safe access range based on whether the array reference meets one or more of the following criteria:

the array reference appears in all conditional paths of the loop source code;

the array reference is contained in all conditional paths ending in or starting at an insertion point of the array reference in the loop source code; or all conditional paths starting at the insertion point contain a first array reference and all conditional paths ending in the insertion point contain a second array reference, such that the array reference inserted at the insertion point is within an array range established by the first and second reference.

14. The computer program product of claim 9, wherein the computer readable program further causes the computing device to:

generate executable code based on the optimized code; and execute the executable code on a processor of the data processing system.

15. The computer program product of claim 9, wherein the safe access range is determined as corresponding to an access range where a lowest value corresponds to a maximum of a lowest reference of each of a plurality of possible access ranges corresponding to different paths through the loop, and wherein a highest value in the safe range corresponds to a minimum of a highest reference of each of the plurality of possible access ranges corresponding to the different paths through the loop.

16. An apparatus, comprising:

a processor; and a memory coupled to the processor, wherein the memory comprises instructions which, when executed by the processor, cause the processor to:

analyze blocks of source code to identify a conditional control flow loop having loop source code specifying a total access range for an array reference, identify a safe access range, of the total access range of the array reference in the loop source code, over which a compiler-based optimization of the loop source code can be safely applied without introducing new exception conditions;

perform the compiler-based optimization of the loop source code based on the identified safe access range to generate optimized code; and output the optimized code for generation of executable code for execution, wherein the instructions cause the processor to identify the safe access range of the total access range of the array reference in the loop source code by:

determining a first access range of the array reference over which the loop source code is safe for the compiler-based optimization of the loop source code;

determining a second access range of the array reference over which the loop is unsafe for the compiler-based optimization of the loop source code; and performing the compiler-based optimization of the loop source code based on the identification of the first access range and second access range, and wherein determining a first access range of the array reference over which the loop is safe for the compiler-based optimization comprises determining an access range of the array reference that is encountered regardless of which conditional path of the loop is taken when the source code is executed.

* * * * *